(12) United States Patent
Shah et al.

(10) Patent No.: US 7,694,100 B2
(45) Date of Patent: Apr. 6, 2010

(54) MANAGING SYSTEM MEMORY RESIDENT DEVICE MANAGEMENT QUEUES

(75) Inventors: Hemal V. Shah, Austin, TX (US); Gary Y. Tsao, Austin, TX (US); Arturo L. Arizpe, Wimberley, TX (US); Scott Hahn, Beaverton, OR (US); Ali S. Oztaskin, Beaverton, OR (US); Greg D Cummings, Portland, OR (US); Ellen M. Deleganes, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1443 days.

(21) Appl. No.: 11/018,009

(22) Filed: Dec. 20, 2004

(65) Prior Publication Data

US 2006/0133396 A1    Jun. 22, 2006

(51) Int. Cl.
    *G06F 13/00*    (2006.01)

(52) U.S. Cl. .................. 711/170; 711/171; 711/172; 710/22; 709/212; 709/213

(58) Field of Classification Search ................ None
    See application file for complete search history.

(56) References Cited

U.S. PATENT DOCUMENTS

| 6,721,806 | B2 * | 4/2004 | Boyd et al. ............ 719/312 |
| 2004/0049580 | A1 * | 3/2004 | Boyd et al. ............ 709/226 |
| 2005/0228936 | A1 * | 10/2005 | Kuo et al. .............. 711/1 |
| 2008/0148008 | A1 * | 6/2008 | Arndt et al. ............ 711/209 |

* cited by examiner

*Primary Examiner*—Hetul Patel
(74) *Attorney, Agent, or Firm*—Grossman, Tucker, Perreault & Pfleger, PLLC

(57) ABSTRACT

In one embodiment, a method is provided. The method of this embodiment provides determining if a management queue can be created, and if a management queue can be created, allocating virtually contiguous memory to a management queue associated with a device, registering the management queue, and creating a management queue context.

35 Claims, 7 Drawing Sheets

MANAGING SYSTEM MEMORY RESIDENT DEVICE MANAGEMENT QUEUES

FIELD

Embodiments of this invention relate to managing system memory resident device management queues.

BACKGROUND

A system memory resident device management queue is a queue that may reside on a device for managing messages, and that may be managed by system memory. For example, a system memory resident device management queue may comprise a system memory resident device management queue to manage management queue elements. Alternatively, a system memory resident device management queue may comprise a system memory resident device completion queue to manage completion elements. Current implementations of system memory resident device management queues may not scale well to system memory resources.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples may be described in detail, or where a list of examples may be provided, it should be understood that the examples are not to be construed as exhaustive, and do not limit embodiments of the invention to the examples described and/or illustrated.

Embodiments of the present invention may be provided, for example, as a computer program product which may include one or more machine-accessible media having machine-executable instructions that, when executed by one or more machines such as a computer, network of computers, or other electronic devices, may result in the one or more machines carrying out operations in accordance with embodiments of the present invention. A machine-accessible medium may include, but is not limited to, floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable media suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

Figure 1:
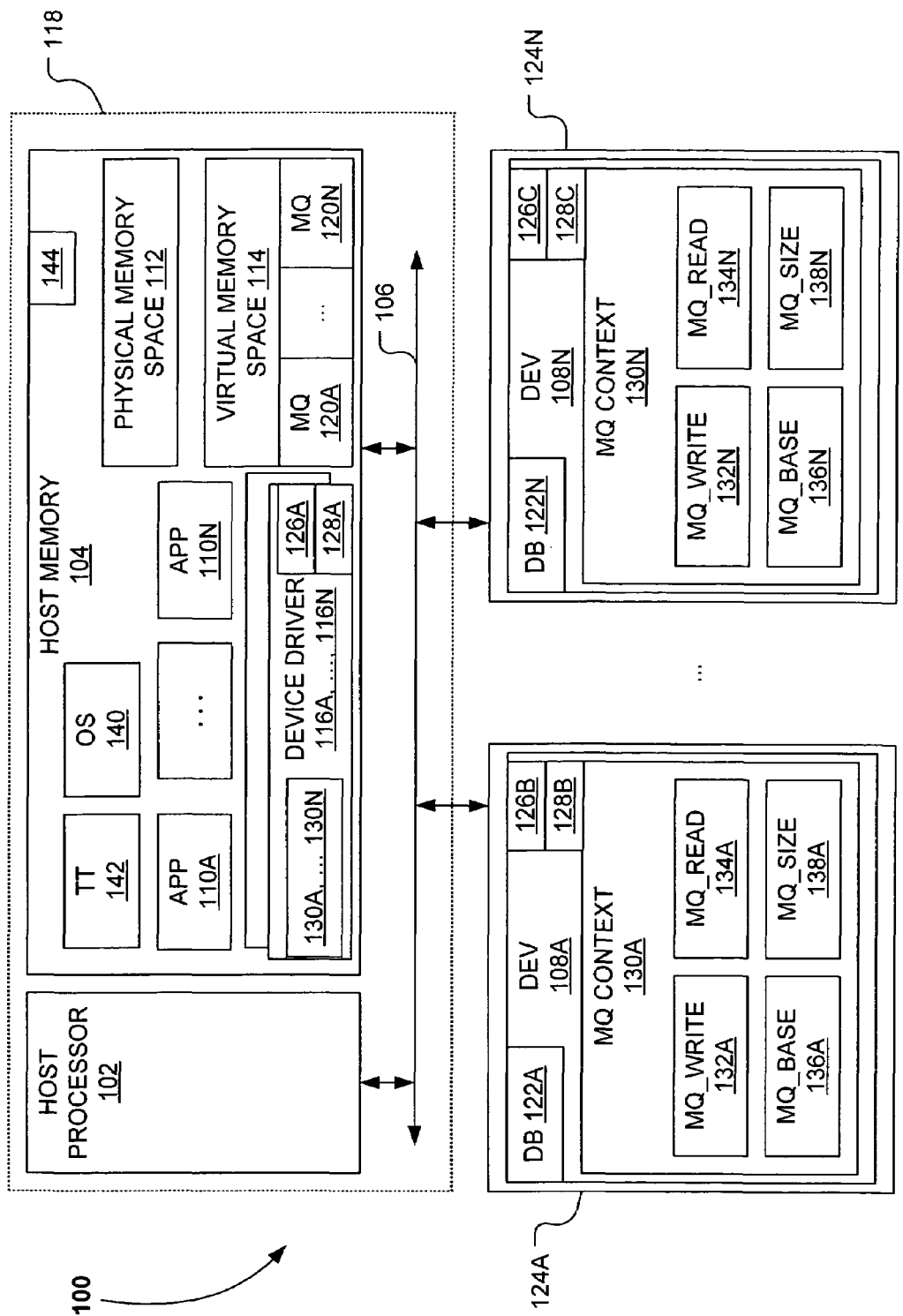
FIG. 1 illustrates a system embodiment.

FIG. 1 illustrates a system in one embodiment. System 100 may comprise host processor 102, host memory 104, bus 106, and one or more devices 108A, . . . , 108N. System 100 may comprise more than one, and other types of processors, memories, and buses; however, those illustrated are described for simplicity of discussion. Host processor 102, host memory 104, and bus 106, may be comprised in a single circuit board, such as, for example, a system motherboard 118. Rather than reside on circuit cards 124A, . . . , 124N, one or more devices 108A, . . . , 108N may instead be comprised on system motherboard 118.

Host processor 102 may comprise, for example, an Intel® Pentium® microprocessor that is commercially available from the Assignee of the subject application. Of course, alternatively, host processor 102 may comprise another type of microprocessor, such as, for example, a microprocessor that is manufactured and/or commercially available from a source other than the Assignee of the subject application, without departing from this embodiment.

Bus 106 may comprise a bus that complies with the Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Alternatively, for example, bus 106 may comprise a bus that complies with the PCI Express Base Specification, Revision 1.0a, Apr. 15, 2003 available from the PCI Special Interest Group (hereinafter referred to as a "PCI Express bus"). Bus 106 may comprise other types and configurations of bus systems.

Host memory 104 may store machine-executable instructions 144 that are capable of being executed, and/or data capable of being accessed, operated upon, and/or manipulated by circuitry, such as circuitry 126A, 126B, 126C. Host memory 104 may, for example, comprise read only, mass storage, random access computer-accessible memory, and/or one or more other types of machine-accessible memories. The execution of program instructions 144 and/or the accessing, operation upon, and/or manipulation of this data may result in, for example, system 100 and/or circuitry 126A, 126B, 126C carrying out some or all of the operations described herein.

Each device 108A, . . . , 108N and associated circuitry 126B, 126C may be comprised in a circuit card 124A, . . . , 124N that may be inserted into a circuit card slot (not shown). When circuit card 124A, . . . , 124N is inserted into circuit card slot, PCI bus connector (not shown) on circuit card slot may become electrically and mechanically coupled to PCI bus connector (not shown) on circuit card 124A, . . . , 124N. When these PCI bus connectors are so coupled to each other, circuitry 126B, 126C in circuit card 124A, . . . , 124N may become electrically coupled to bus 106. When circuitry 126B, 126C is electrically coupled to bus 106, host processor 102 may exchange data and/or commands with circuitry 126B, 126C, via bus 106 that may permit host processor 102 to control and/or monitor the operation of circuitry 126B, 126C. Alternatively, device 108A, . . . , 108N may be located on motherboard 118, or on a chipset (not shown), for example.

Circuitry 126A, 126B, 126C may comprise one or more circuits to perform one or more operations described herein as being performed by device driver 116A, . . . , 116N, device 108A, . . . , 108N, or system 100. In described embodiments, operations said to be performed by device driver 116A, . . . , 116N or by device 108A, . . . , 108N should be understood as generally being able to be performed by system 100 without departing from embodiments of the invention. Circuitry 126A, 126B, 126C may be hardwired to perform the one or more operations. For example, circuitry 126A, 126B, 126C may comprise one or more digital circuits, one or more analog circuits, one or more state machines, programmable circuitry, and/or one or more ASIC's (Application-Specific Integrated Circuits). Alternatively, and/or additionally, these operations may be embodied in programs that may perform functions described below by utilizing components of system 100 described above. For example, circuitry 126A, 126B, 126C may execute machine-executable instructions 144 to perform these operations. Alternatively, circuitry 126A, 126B, 126C may comprise computer-readable memory 128A, 128B, 128C having read only and/or random access memory that may store program instructions, similar to machine-executable instructions 144.

Host memory 104 may comprise operating system (labeled "OS") 140, one or more applications (labeled "APP") 110A, . . . , 110N, one or more device drivers 116A, . . . , 116N, a physical memory space 112, a virtual memory space 114, and a translation table (hereinafter "TT") 142. In at least one embodiment of the invention, TT 142 may comprise a translation and protection table, generally used to handle packet mapping and to prevent invalid access to memory. In embodiments of the invention, certain operations that may be performed by device driver 116A, . . . , 116N, may alternatively be performed by a user-mode library.

System 100 may also include one or more management queues ("MQ") 120A, . . . , 120N. A management queue 120A, . . . , 120N may comprise, for example, a work queue, or a completion queue. In work queues, a device driver may write work queue elements to a work queue, and a device may read work queue elements from the work queue. In completion queues, a device may write completion queue elements to the completion queue, and a device driver may read completion queue elements from the completion queue. While operations described in some embodiments herein may be descriptive of work queues, it should be understood that such operations may be equally applicable to completion queues unless otherwise indicated.

Figure 2:
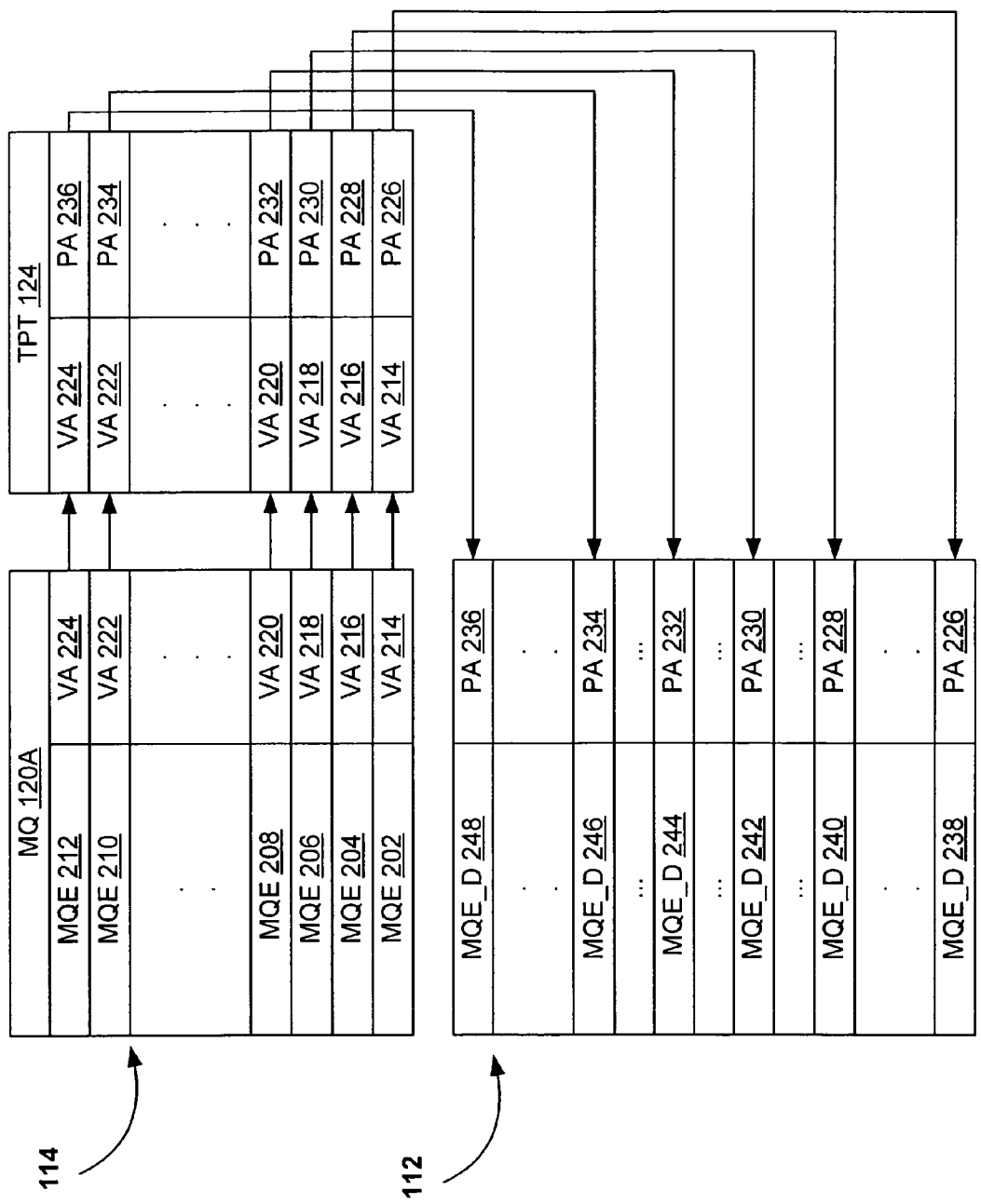
FIG. 2 illustrates a management queue in accordance with one embodiment of the invention.

As illustrated in FIG. 2, one or more management queues 120A, . . . , 120N may be stored in virtually contiguous memory in virtual memory space 114. As used herein, virtual memory space refers to space that may be allocated for mapping one or more virtual addresses to a corresponding number of physical addresses in physical memory space, and a "virtually contiguous memory" refers to contiguous portions of a virtual memory space that may be mapped to physical data that is actually stored in physical memory. For example, a virtual address can be mapped to a physical address by calculating the physical address from a base address of a virtual address. As another example, a virtual address can be mapped to a physical address by using a linked list, where, for example, each entry in the linked list may comprise a virtual address, a corresponding physical address where physical data may be stored, and a physical address corresponding to a next virtual address. Of course, there may be other manners in which a linked list maybe implemented without limiting embodiments of the invention.

In embodiments of the invention, the entire virtual memory space 114, or even portions of the virtual memory space 114 may reside in physical memory space 112. Any portions of virtual memory space 114 that do not reside in physical memory space 112 may reside in a memory, which may include optical disks, CD-ROM's, magneto-optical disks, flash memory, and tape drives. Also, while oftentimes the physical memory corresponding to the virtually contiguous memory may be non-contiguous, embodiments of the invention are not so limited, and the physical memory may alternatively or additionally be contiguous.

In one embodiment, a virtually contiguous memory may be allocated to one or more management queues 120A, . . . , 120N. In one embodiment, each management queue 120A, . . . , 120N may include a number of entries, where each entry may store information by which physical data may be retrieved from physical memory space 112, so that each entry may be said to correspond to physical data stored in a physical memory space 112. In one embodiment, each management queue 120A, . . . , 120N may be organized as a circular buffer.

Each entry in the management queue 120A, . . . , 120N may comprise a management queue element (hereinafter "MQE") 202, 204, 206, 208, 210, 212. An "MQE", as used herein, refers to a management request associated with physical data located in a physical memory space. As described herein, each MQE 202, 204, 206, 208, 210, 212 may be accessed by a virtual address ("VA") 214, 216, 218, 220, 222, 224 in virtual memory space 114, where the physical data, MQE_D 238, 240, 242, 244, 246, 248, corresponding to the MQE 202, 204, 206, 208, 210, 212, may be retrieved from physical memory space 112.

An MQE 202, 204, 206, 208, 210, 212 may be generated from a management request having one or more attributes, and one or more messages. For example, the one or more attributes may be specific to hardware, where hardware may comprise a device 108A, . . . , 108N, and the one or more messages may comprise commands, such as writing to a management queue or reading from a management queue. A message may comprise, for example, a command to send a device 108A, . . . , 108N data that resides in host memory 104. A management request may be generated by operating system 140, or by application 110A, . . . , 110N, for example. An MQE 202, 204, 206, 208, 210, 212 may comprise a size of MQE_Size. MQE_Size may be predetermined, or may be dynamically determined.

An MQE 202, 204, 206, 208, 210, 212 may be written to a management queue 120A, . . . , 120N by a device driver 116A, . . . , 116N, and may be read from a management queue 120A, . . . , 120N by a device 108A, . . . , 108N. Device 108A, . . . , 108N may process an MQE 202, 204, 206, 208, 210, 212 by reading the MQE 202, 204, 206, 208, 210, 212 from the management queue 120A, . . . , 120N, and performing the command associated with the message in the MQE (e.g., write data to a location). Once the command is performed, the MQE 202, 204, 206, 208, 210, 212 may be completed.

Each virtual address 214, 216, 218, 220, 222, 224 associated with an MQE 202, 204, 206, 208, 210, 212 may be translated into a physical address 226, 228, 230, 232, 234, 236 from which a corresponding MQE_D 238, 240, 242, 244, 246, 248 may be accessed. TT 142 may enable system 100 to translate each virtual address 214, 216, 218, 220, 222, 224 to a physical address 226, 228, 230, 232, 234, 236. TT 142 may reside in virtually contiguous memory of virtual memory space 114, or in physically contiguous memory of physical memory space 112. Also, each device 108A, ..., 108N may cache all or a portion of TT 142. In one embodiment, each device 108A, ..., 108N may cache a portion of TT 142, where the cached portion of TT 142 may comprise one or more entries in TT 142 that are associated with the given device 108A, ..., 108N.

Referring back to FIG. 1, each device 108A, ..., 108N may comprise one or more doorbells (labeled "DB") 122A, ..., 122N and one or more management queue contexts 130A, ..., 130N (labeled "MQ context"). Although each device 108A, ..., 108N is illustrated as comprising one doorbell 122A, ..., 122N and one management queue context 130A, ..., 130N, embodiments of the invention are not so limited, and each device 108A, ..., 108N may instead comprise a plurality of doorbells 122A, ..., 122N, and/or a plurality of management queue contexts 130A, ..., 130N.

Doorbell 122A, ..., 122N may be memory-mapped to an address space, such that when doorbell 122A, ..., 122N is accessed by device driver 116A, ..., 116N, a corresponding device 108A, ..., 108N may be notified via a hardware mechanism that an MQE 238, 240, 242, 244, 246, 248 is available for processing, for example. In one embodiment, doorbell 122A, ..., 122N may be used in the implementation of work queues, and may not be required in the implementation of completion queues.

Each management queue context 130A, ..., 130N may comprise information about a corresponding management queue 120A, ..., 120N. The information may include, for example, MQ_Write 132A, ..., 132N, MQ_Read 134A, ..., 134N, MQ_Base 136A, ..., 136N, and MQ_Size 138A, ..., 138N. Management queue context 130A, ..., 130N may be accessed by device driver 116A, ..., 116N or a user-mode library using a corresponding doorbell 122A, 122N.

MQ_Base 136A, ..., 136N may indicate a starting address of the virtually contiguous memory in virtual memory space 114 that is allocated to a given management queue 120A, ..., 120N. MQ_Size 138A, ..., 138N may indicate a size capacity of the management queue 120A, ..., 12N. The size capacity of a management queue 120A, ..., 120N may be measured by the number of MQEs that the management queue 120A, ..., 120N can store. These values may be initialized upon creation of the management queue 120A, ..., 120N. Furthermore, these values may be modified upon resizing the management queue 120A, ..., 120N (to be discussed).

MQ_Write 132A, ..., 132N may indicate a virtual address to which an MQE 202, 204, 206, 208, 210, 212 may be written in a management queue 120A, ..., 120N. MQ_Write 132A, ..., 132N may be incremented (e.g., by one or more) each time an MQE 202, 204, 206, 208, 210, 212 is written to the management queue 120A, ..., 120N. In one embodiment, MQ_Write 132A, ..., 132N may comprise an index to an entry in the management queue 120A, ..., 120N, where the index may be used to obtain a corresponding virtual address in the management queue 120A, ..., 120N. For example, a virtual address, V_Address, in the management queue 120A, ..., 120N corresponding to an index, I (e.g., between 0 and (MQ_Size)-1), indicated by MQ_Write 132A, ..., 132N may be generated using the following equation:

$V\_Address[I] = MQ\_Base + I * MQE\_Size$.

MQ_Read 134A, ..., 134N may indicate a virtual address from which an MQE 202, 204, 206, 208, 210, 212 may be read in the management queue 120A, ..., 120N. MQ_Read 134A, ..., 134N may be incremented (e.g., by one or more) each time an MQE 202, 204, 206, 208, 210, 212 is read from the management queue 120A, ..., 120N. In one embodiment, MQ_Read 134A, ..., 134N may comprise an index to an entry in the management queue 120A, ..., 120N, where the index may be used to obtain a virtual address in the management queue 120A, ..., 120N. For example, a virtual address, V_Address, in the management queue 120A, ..., 120N corresponding to an index, I (e.g., between 0 and (MQ_Size)-1), indicated by MQ_Read 134A, ..., 134N may be generated using the following equation:

$V\_Address[I] = MQ\_Base + I * MQE\_Size$.

Each device driver 116A, ..., 116N may control one or more devices 108A, ..., 108N, and may also maintain management queue context 130A, ..., 130N for each device 108A, ..., 108N. A device 108A, ..., 108N may comprise an I/O device, such as a network controller. For example, network controller may comprise an Ethernet controller, or Infiniband™ adapter. An Ethernet controller is a device that controls the transfer of data from a computer to a peripheral device over the Ethernet. The Ethernet is set forth in the IEEE (Institute for Electrical and Electronics Engineers) 802.3 standard, published by the IEEE located at 1828 L Street, N.W., Suite 1202, Washington, D.C., 20036-5104. The IEEE 802.3 standard is specification that describes the implementation of the physical and data link layers of the OSI (Open Systems Interconnect) Reference Model.

An Infiniband™ adapter is circuitry that enables the Infiniband™ architecture to be supported. Infiniband™ is an architecture and specification for data flow between processors and I/O devices. The Infiniband™ architecture is set forth in "Infiniband™ Architecture Specification", Volume 1 and Volume 2, Release 1.1, dated Nov. 6, 2002, published by the Infiniband™ Trade Association located at 5440 SW Westgate Drive, Suite 217, Portland, Oreg., 97221.

In one embodiment, network controller may comprise an RNIC (RDMA—Remote Direct Memory Access—Network Interface Card). RNIC is described in, for example, "RNIC Interoperability" by J. Carrier and J. Pinkerton, in an Internet Draft dated November 2004, published by the Internet Engineering Task Force (IETF). An RNIC may comprise management pairs (hereinafter "QP's"). "QP's" refer to resources that may be used by a system to manage RNIC operations. Each QP may comprise two management queues: a receive queue (hereinafter "RQ"), and a send queue (hereinafter "SQ"). An RNIC device driver may use RQ's and SQ's to enqueue management queue elements to the RNIC. In one embodiment, each RQ and each SQ may comprise a management queue 120A, ..., 120N.

Figure 3:
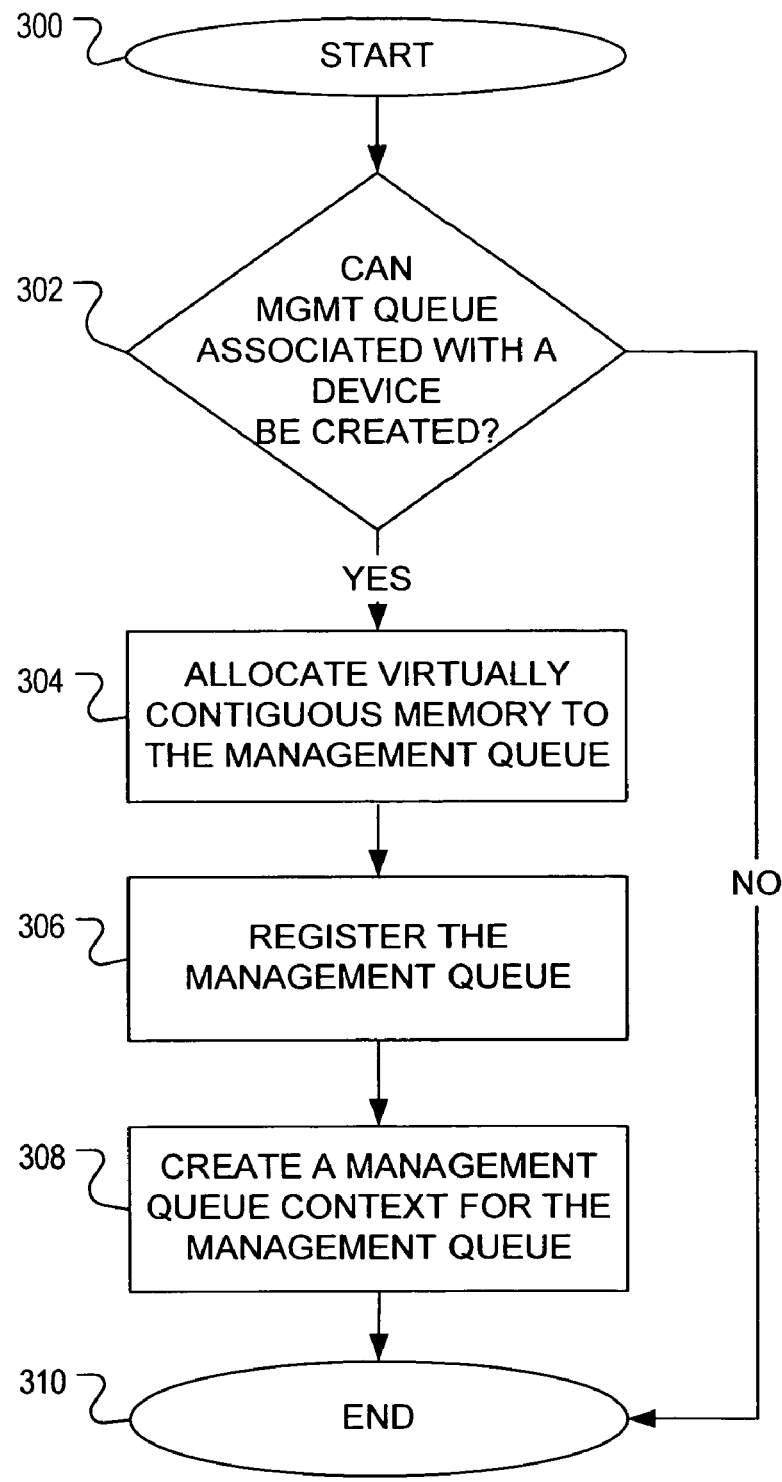
FIG. 3 is a flowchart illustrating the creation of a management queue in accordance with one embodiment of the invention.

FIG. 3 illustrates a method that may use the components and structures of FIGS. 1 and 2 to create a management queue according to one embodiment. The method begins at block 300 and continues to block 302 where device driver 116A, ..., 116N may determine if a management queue associated with a device may be created. In one embodiment, this may be performed in response to an application 110A, ..., 110N attempting to create a management queue 120A, ..., 120N directed to a corresponding device 108A, 108N, where a management queue 120A, ..., 120N designated for that application 110A, ..., 110N does not yet exist. In another embodiment, this may be performed at other times, such as when an application 110A, ..., 110N is initialized. In both cases, application 110A, ..., 110N may specify an initial size (e.g., MQ_Size) of the management queue 120A, ..., 120N. Alternatively, the size (e.g., MQ_Size) may be set to a default size.

Device driver 116A, . . . , 116N may determine if a management queue 120A, . . . , 120N can be created by performing parameter checking. Parameter checking may comprise checking availability of host memory 104, management queue 120A, . . . , 120N availability, and whether the size of the management queue, MQ_Size, is supported. In one embodiment, system 100 may specify a maximum number of management queues 120A, . . . , 120N that may be created, as well as the maximum size of each management queue 120A, . . . , 120N.

If at block 302, the management queue 120A, . . . , 120N cannot be created, the method ends at block 310. If at block 302, the management queue 120A, . . . , 120N can be created, the method continues to block 304.

At block 304, device driver 116A, . . . , 116N may allocate virtually contiguous memory to the management queue 120A, . . . , 120N. Allocation of virtually contiguous memory may comprise determining the size of the virtually contiguous memory. In one embodiment, determining the size, X, of the virtually contiguous memory may comprise the following calculation:

X=MQ_Size*MQE_Size, where MQ_Size may be defined by the number of MQEs 202, 204, 206, 208, 210, 212. For example, if MQ_Size=1024 entries, and MQE_Size=128 bytes, then X=131072 (1024*128) bytes.

Allocated virtually contiguous memory may comprise N number of blocks:

N=ceiling[X/Y], where the ceiling may indicate a rounded-up integer (for example, where X is not a multiple of Y) that may represent the number of blocks, and where Y may indicate the size of each block. The size of Y may be determined upon creation of the management queue. Alternatively, it may be a parameter determined by system 100. For example, if Y=4096 bytes, then N=ceiling[131072/4096]=32 blocks.

Allocation of virtually contiguous memory may additionally comprise pinning the physical memory in physical memory space 112. As used herein, "pinning" refers to allocating physical memory in physical memory space to the virtually contiguous memory in virtual memory space. This may comprise telling the operating system to keep the virtual-to-physical mapping of the chunks of physical memory constant and to not swap out pieces of the physical memory.

At block 306, device driver 116A, . . . , 116N may register the management queue 120A, . . . , 120N. Management queue 120A, . . . , 120N may be registered by creating an entry, MQE 202, 204, 206, 208, 210, 212, for each block of virtually contiguous memory in virtual memory space 114, where each entry, MQE 202, 204, 206, 208, 210, 212, may be mapped to a block of physical memory space 112. In an embodiment, one or more work queues 120A, . . . , 120N may be mapped to a block. Registration of management queue 120A, . . . , 120N may further include creating translation entries in a translation table, such as TT 142.

At block 308, device driver 116A, . . . , 116N may create a management queue context 130A, . . . , 130N for the management queue 120A, . . . , 120N. In one embodiment, creating a management queue context 130A, . . . , 130N may comprise creating and initializing MQ_Write 132A, . . . , 132N, MQ_Read 134A, . . . , 134N, MQ_Base 136A, . . . , 136N, and MQ_Size 138A, . . . , 138N. Device 108A, . . . , 108N may further return completion status to driver 116A, . . . , 116N.

The method ends at block 310.

Figure 4:
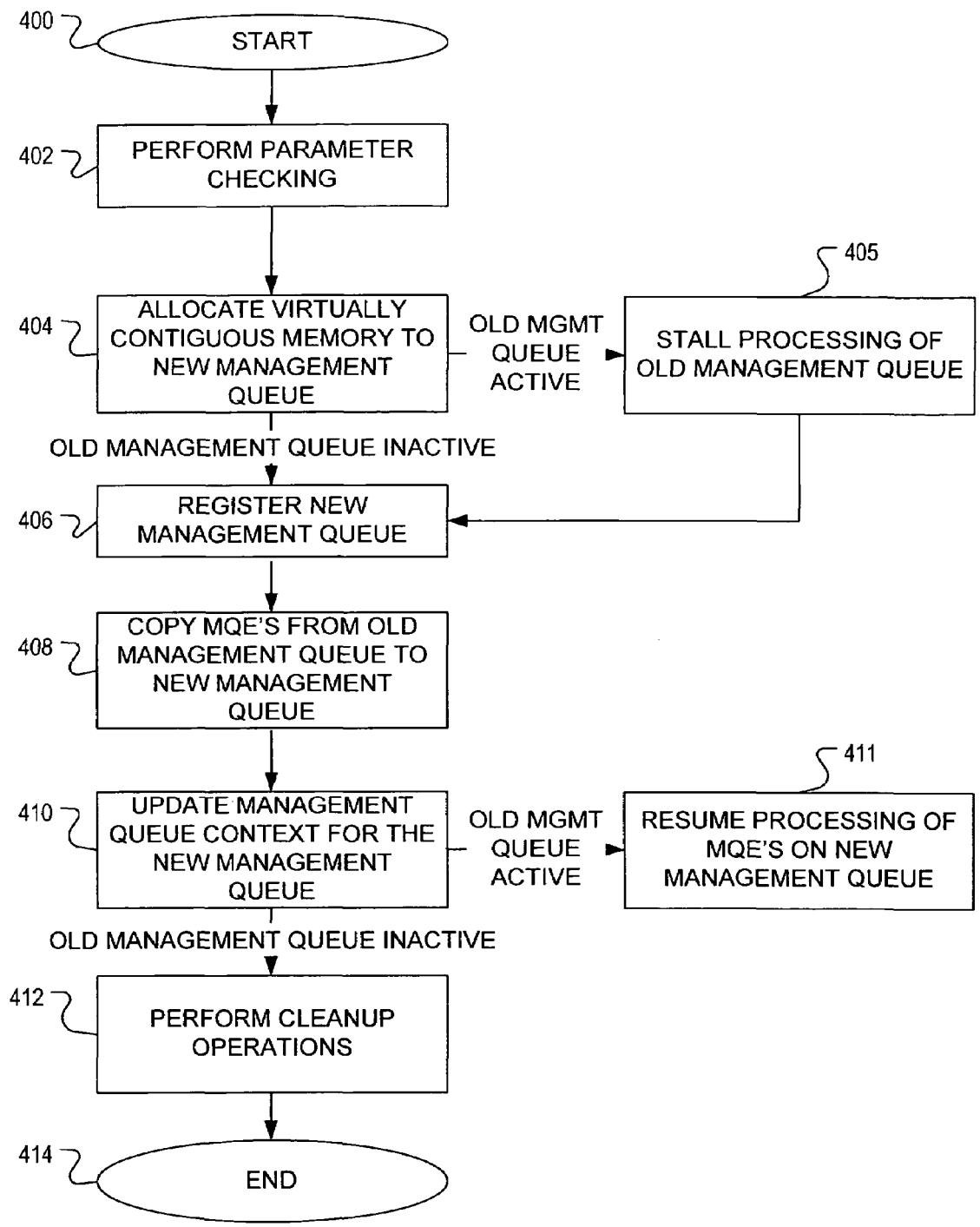
FIG. 4 is a flowchart illustrating the resizing of a management queue in accordance with one embodiment of the invention.

FIG. 4 illustrates a method that may use the components and structures of FIGS. 1 and 2 to resize a management queue in one embodiment. The method begins at block 400 and continues to block 402 where device driver 116A, . . . , 116N may perform parameter checking. Parameter checking may comprise:

Determining system memory resource availability.

Determining management queue availability.

Determining what the supported management queue size (e.g., MQ_Size) is.

Determining the number of outstanding MQEs 202, 204, 206, 208, 210, 212 on the old management queue 120A, . . . , 120N.

At block 404, device driver 116A, . . . , 116N may allocate virtually contiguous memory in virtual memory space 114 to the new management queue 120A, . . . , 120N.

If the old management queue 120A, . . . , 120N is active, processing may proceed to block 405 where device driver 116A, . . . , 116N may instruct device 108A, . . . , 108N to stall processing of the old management queue 120A, . . . , 1120N. A management queue that is active may be a management queue that is not empty, and/or that is in operation. A management queue that is in operation is a management queue in which at least one management queue element is being read from the management queue or written to the management queue. Likewise, a management queue that is not active is a management queue that is not in operation in which no management queue elements are being read from the management queue or written to the management queue.

Device 108A, . . . , 108N may stall processing of the old management queue 120A, . . . , 120N by:

Dropping all new incoming messages targeted to the old management queue 120A, . . . , 120N.

Stopping the processing of any new MQEs 202, 204, 206, 208, 210, 212 directed to the old management queue 120A, . . . , 120N.

Stalling completion generation for MQEs 202, 204, 206, 208, 210, 212 in progress on the old management queue 120A, . . . , 120N.

Stalling the processing of messages associated with the old management queue 120A, . . . , 120N.

Handle asynchronous errors on the old management queue 120A, . . . , 120N.

Device 108A, . . . , 108N may acknowledge the stall operation, provide MQ_Read to indicate the next MQE 202, 204, 206, 208, 210, 212 to be read when processing of MQEs 202, 204, 206, 208, 210, 212 resumes, and stall any management queue 120A, . . . , 120N processing until a resume command is received from device driver 116A, . . . , 116N.

At block 406, device driver 116A, . . . , 116N may register the new management queue 120A, . . . , 120N. In one embodiment, management queue 120A, . . . , 120N may be registered upon device 108A, . . . , 108N acknowledging a stall operation. Registering management queue 120A, . . . , 120N may comprise creating an entry for each block of the newly created virtually contiguous memory in virtual memory space 114, and by creating a new set of TT entries in TT 142.

At block 408, device driver 116A, . . . , 116N may copy MQEs 202, 204, 206, 208, 210, 212 from the old management queue 120A, . . . , 120N to the new management queue 120A, . . . , 120N. In one embodiment, for example where the management queue is not active, outstanding MQEs 202, 204, 206, 208, 210, 212 may be copied from the old management queue to the new management queue, and MQ_Read 134A, . . . , 134N and MQ_Write 134A, . . . , 134N may be adjusted. In another embodiment, for example where the management queue is active, already posted (i.e., written and submitted by device driver 116A, . . . , 116N but not processed by device 108A, . . . , 108N) MQEs 202, 204, 206, 208, 210, 212 may be copied from the old management queue to the new management queue, and MQ_Read 134A, ..., 134N and MQ_Write 134A, ..., 134N may be adjusted.

At block 410, device driver 116A, ..., 116N may update the management queue context 130A, ..., 130N for the new management queue 120A, ..., 120N. For example, device driver 116A, ..., 116N may do this by issuing an administrative command to the device 108A, ..., 108N to update the management queue context 130A, ..., 130N fields: MQ_Write 132A, ..., 132N, MQ_Read 134A, ..., 134N, MQ_Base 136A, ..., 136N, and MQ_Size 138A, ..., 138N as necessary. Upon receiving the administrative command, the device 108A, ..., 108N may update the management queue context 130A, ..., 130N and return the status to the driver 116A, ..., 116N.

If the old management queue 120A, ..., 120N was active, processing may resume to block 411 where device 108A, ..., 108N may resume processing of MQEs 202, 204, 206, 208, 210, 212 on the new management queue 120A, ..., 120N using updated management queue context 130A, ..., 130N. The method may continue to block 412.

At block 412, device driver 116A, ..., 116N may perform cleanup operations. Cleanup operations may comprise:

Invalidating the old set of TT 142 entries.

Deallocating system memory associated with the old size of the management queue 120A, ..., 120N in accordance with the system's 100 resource management policy. For example, a resource management policy may dictate that allocated memory may be immediately freed. Alternatively a resource management policy may dictate that allocated memory may be cached for reuse.

The method ends at block 414.

If any of operations 402-412 fails, then driver 116A, ..., 116N may:

Destroy the management queue without waiting for any requests to complete.

Perform resource cleanup by freeing the new set of TT entries and deallocating the memory allocated to the new size of the management queue.

Report the failed status to the application.

Generate an asynchronous error reporting catastrophic error on the management queue.

Figure 5:
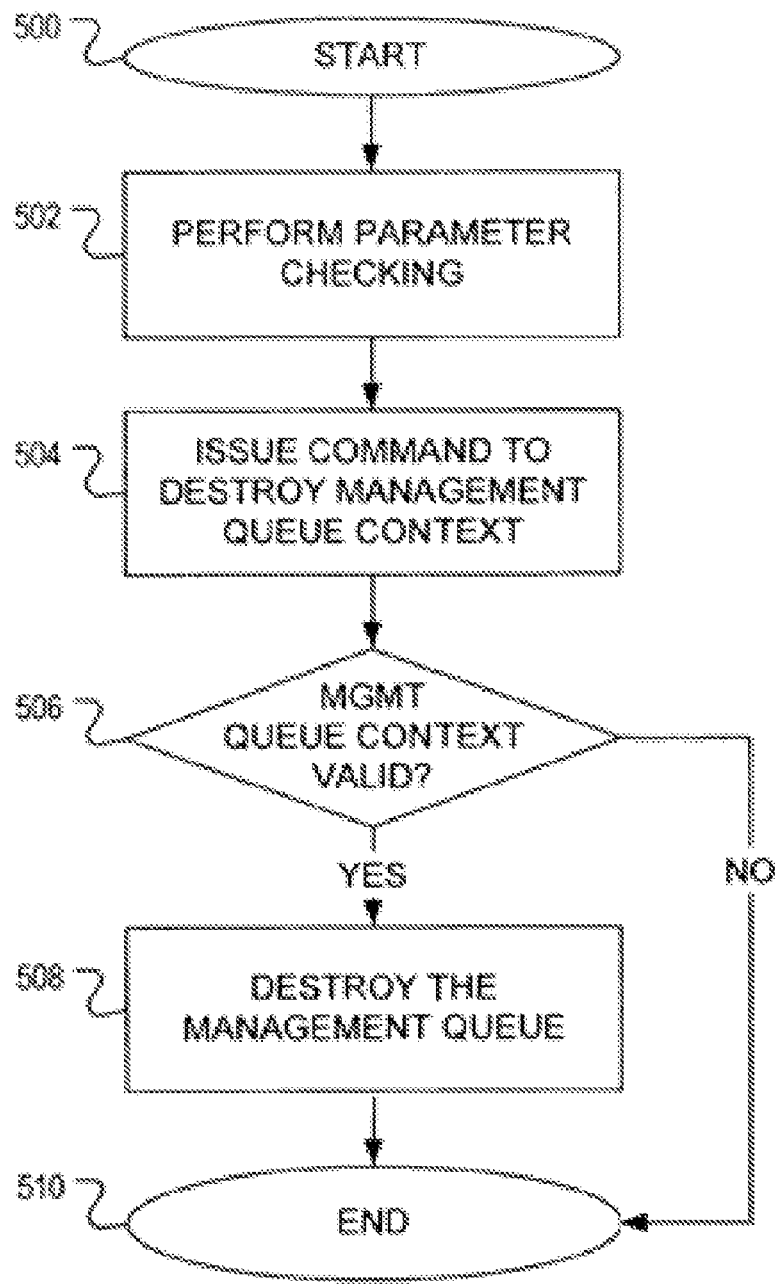
FIG. 5 is a flowchart illustrating the destruction of a management queue in accordance with one embodiment of the invention.

FIG. 5 illustrates a method that may use the components and structures of FIGS. 1 and 2 to destroy a management queue according to one embodiment. The method begins at block 500 and continues to block 502 where device driver 116A, ..., 116N may check one or more parameters. Parameter checking in this context may include determining if the management queue to be destroyed is valid (e.g., if it has already been destroyed, then it is invalid), and/or determining if an application is allowed to destroy the particular management queue.

At block 504, device driver 116A, ..., 116N may issue an administrative command to a device 108A, ..., 108N corresponding to the management queue 120A, ..., 120N to destroy the management queue context 130A, ..., 130N.

At block 506, device 108A, ..., 108N may determine if the management queue context 130A, ..., 130N is valid. For example, device 108A, ..., 108N may determine if the management queue context 130A, ..., 130N still exists. If the management queue context 130A, ..., 130N is valid, processing may continue to block 508. If the management queue context 130A, ..., 130N is not valid, the method may end at block 510.

At block 508, device 108A, ..., 108N may destroy the management queue 120A, ..., 120N. In one embodiment, this may comprise:

Freeing management queue context 130A, ..., 130N by flushing incomplete management queue elements. Flushing incomplete management queue elements may be accomplished, for example, by marking the management queue elements as being completed.

Freeing all outstanding messages.

Freeing all management queue resources, including the allocated memory, management queue elements, and management queue context, for example.

The method ends at block 510.

Figure 6:
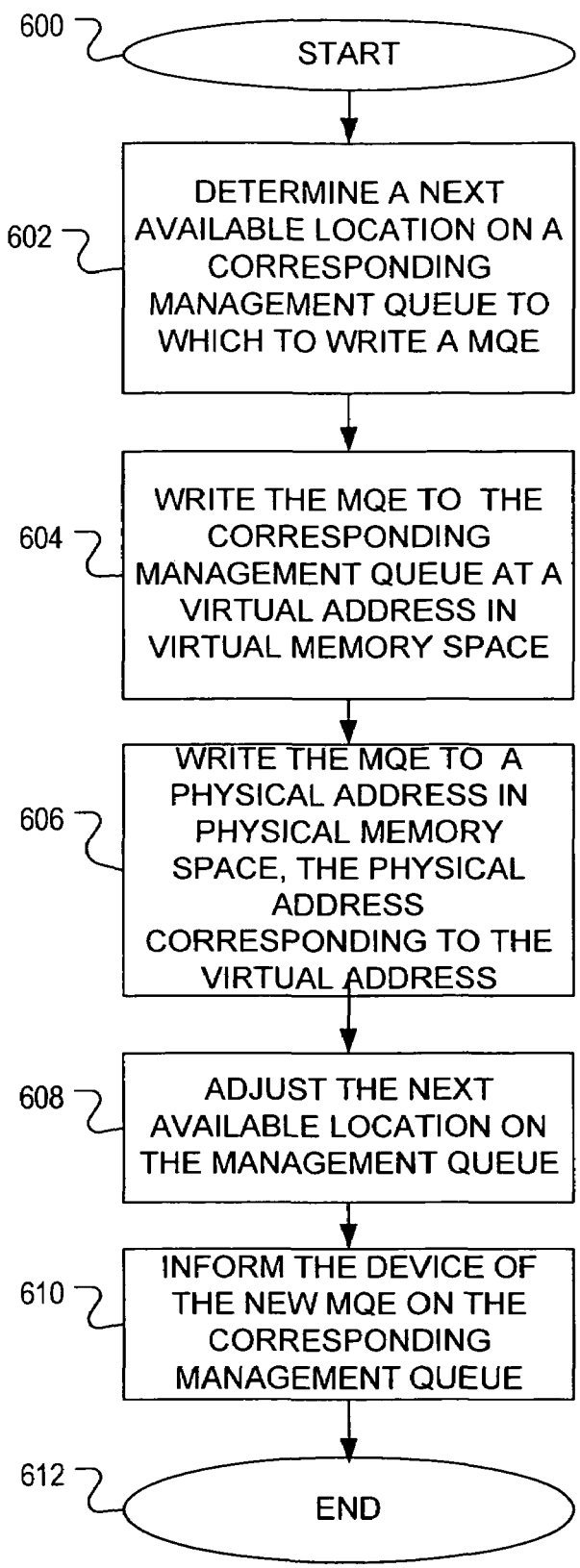
FIG. 6 is a flowchart illustrating writing to a management queue in accordance with one embodiment of the invention.

FIG. 6 illustrates a method in another embodiment. The method begins at block 600 and continues to block 602 where device driver 116A, ..., 116N may determine a next location on a corresponding management queue 120A, ..., 120N to which to write an MQE 202, 204, 206, 208, 210, 212. In one embodiment, next location on management queue 120A, ..., 120N to which MQE 202, 204, 206, 208, 210, 212 may be written may be indicated by MQ_Write 132A, ..., 132N.

At block 604, device driver 116A, ..., 116N may write MQE 202, 204, 206, 208, 210, 212 to the corresponding management queue 120A, ..., 120N at a virtual address 214, 216, 218, 220, 222, 224 in virtual memory space 114. The virtual address 214, 216, 218, 220, 222, 224 may be based on MQ_Write 132A, ..., 132N.

At block 606, device driver 116A, ..., 116N may write the MQE 202, 204, 206, 208, 210, 212 to a physical address 226, 228, 230, 232, 234, 236 in physical memory space 112, the physical address 226, 228, 230, 232, 234, 236 corresponding to the virtual address 214, 216, 218, 220, 222, 224 of MQE 202, 204, 206, 208, 210, 212. Writing an MQE 202, 204, 206, 208, 210, 212 to a physical address 226, 228, 230, 232, 234, 236 in physical memory space 112 may comprise determining the physical address 226, 228, 230, 232, 234, 236 to which the corresponding virtual address 214, 216, 218, 220, 222, 224 maps, and writing the corresponding MQE_D 238, 240, 242, 244, 246, 248 to that physical address 226, 228, 230, 232, 234, 236. The physical address 226, 228, 230, 232, 234, 236 to which the corresponding virtual address 214, 216, 218, 220, 222, 224 maps may be obtained by finding the virtual address 214, 216, 218, 220, 222, 224 on the TT 142 to obtain the corresponding physical address 226, 228, 230, 232, 234, 236. Alternatively, the virtual address 214, 216, 218, 220, 222, 224 may be translated into a physical address 226, 228, 230, 232, 234, 236 by using operating system 140 and host processor 102 mechanisms.

At block 608, device driver 116A, ..., 116N may adjust the next available location in the management queue 120A, ..., 120N. For example, MQ_Write 132A, ..., 132N may be incremented (e.g., by one or more) to indicate a next location to which a subsequent MQE 202, 204, 206, 208, 210, 212 may be written.

At block 610, device driver 116A, ..., 116N may inform the device 108A, ..., 108N of the availability of the new MQE 202, 204, 206, 208, 210, 212 on the corresponding management queue 120A, ..., 120N. In one embodiment, device driver 116A, ..., 116N may do this by using the corresponding DB 122A, 122B of the device 108A, ..., 108N. Device 108A, ..., 108N may start processing new management queue elements at MQ_Read 134A, ..., 134N. This is further described in FIG. 7.

The method ends at block 612.

Figure 7:
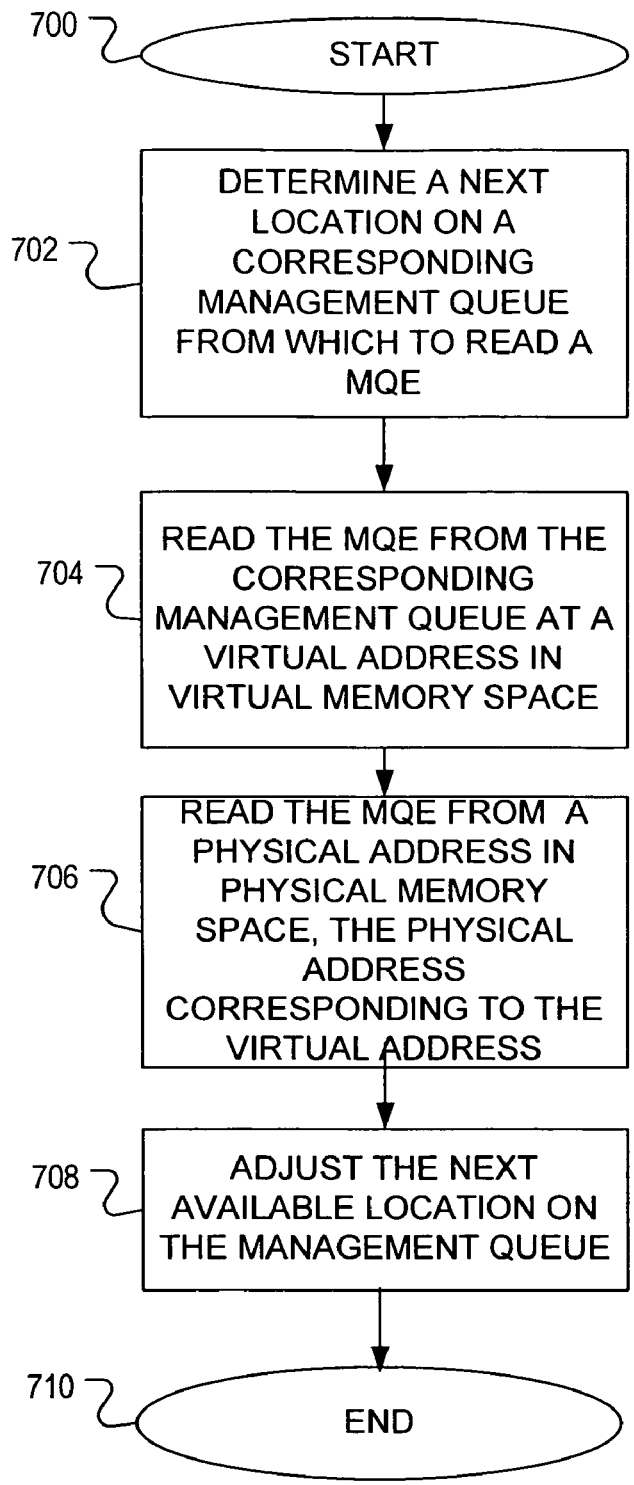
FIG. 7 is a flowchart illustrating reading from a management queue in accordance with one embodiment of the invention.

FIG. 7 illustrates a method in another embodiment. The method begins at block 700 and continues to block 702 where a device 108A, ..., 108N may determine a next location on a corresponding management queue 120A, ..., 120N from which to read an MQE 202, 204, 206, 208, 210, 212. In one embodiment, the next location on management queue 120A, ..., 120N from which an MQE 202, 204, 206, 208, 210, 212 may be read may be indicated by MQ_Read. In one embodiment, this may be performed in response to device 108A, ..., 108N being informed that one or more MQEs 202, 204, 206, 208, 210, 212 are available for processing.

At block 704, device 108A, ..., 108N may read MQE 202, 204, 206, 208, 210, 212 from a corresponding management queue 120A, ..., 120N at a virtual address 214, 216, 218, 220, 222, 224 in virtual memory space 114. The virtual address may be based on MQ_Read 134A, ..., 134N.

At block 706, device 108A, ..., 108N may read the MQE 202, 204, 206, 208, 210, 212 from a physical address 226, 228, 230, 232, 234, 236 in physical memory space 112, the physical address 226, 228, 230, 232, 234, 236 corresponding to the virtual address 214, 216, 218, 220, 222, 224. Reading an MQE 202, 204, 206, 208, 210, 212 from a physical address 226, 228, 230, 232, 234, 236 in physical memory space 112 may comprise determining the physical address 226, 228, 230, 232, 234, 236 to which the corresponding virtual address 214, 216, 218, 220, 222, 224 maps, and reading the corresponding MQE_D 238, 240, 242, 244, 246, 248 from that physical address 226, 228, 230, 232, 234, 236. The physical address 226, 228, 230, 232, 234, 236 to which the corresponding virtual address 214, 216, 218, 220, 222, 224 maps may be obtained by finding the virtual address 214, 216, 218, 220, 222, 224 on the TT 142 to obtain the corresponding physical address 226, 228, 230, 232, 234, 236. Alternatively, the virtual address 214, 216, 218, 220, 222, 224 may be translated into a physical address 226, 228, 230, 232, 234, 236 by using operating system 140 and host processor 102 mechanisms.

At block 708, device 108A, ..., 108N may adjust the next location in management queue 120A, ..., 120N. For example, MQ_Read 134A, ..., 134N may be incremented (e.g., by one or more).

The method ends at block 710.

As described above, MQE's 202, 204, 206, 208, 210, 212 may comprise work queue elements, and may be written by device driver 116A, ..., 116N and read by device 108A, ..., 108N. Alternatively, MQE's 202, 204, 206, 208, 210, 212 may comprise completion queue elements, which may be written by device 108A, ..., 108N and read by device driver 116A, ..., 116N. For completion queues, the method of FIG. 6 may be used by device 108A, ..., 108N to write completion queue elements, and the method of FIG. 7 may be used by device driver 116A, ..., 116N.

CONCLUSION

Therefore, in one embodiment, a method may comprise determining if a management queue can be created, and if a management queue can be created, allocating virtually contiguous memory to a management queue associated with a device, registering the management queue, and creating a management queue context.

Embodiments of the invention offer a flexible and scalable management queue resource management scheme. For example, implementing work queues in a virtually contiguous system memory may free a device from maintaining the work queues on the device memory. Also, using virtually contiguous system memory allows work queues to scale well with system memory, allowing, for example, work queues to be dynamically resized.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. A method comprising:
   determining if a management queue associated with a device can be created;
   if a management queue can be created:
      allocating virtually contiguous memory to the management queue;
      registering the management queue; and
      creating a management queue context;
   checking one or more parameters to determine if resizing of the management queue is possible, the management queue having one or more management queue elements;
   allocating virtually contiguous memory to a new management queue;
   registering the new management queue;
   copying the one or more management queue elements to the new management queue;
   updating the new management queue; and
   performing cleanup operations.

2. The method of claim 1, wherein said determining if a management queue can be created comprises parameter checking, the parameter checking comprising:
   determining if there is enough memory;
   determining if management queues are available; and
   determining if a requested management queue size can be supported.

3. The method of claim 1, wherein said allocating virtually contiguous memory to a management queue comprises:
   determining a size of the virtually contiguous memory; and
   pinning the allocated virtually contiguous memory.

4. The method of claim 1, wherein the management queue comprises a work queue, and the management queue context comprises a work queue context.

5. The method of claim 4, wherein said creating a work queue context comprises creating information about the work queue, the information comprising at least one of:
   a base address to indicate the starting address of the allocated virtually contiguous memory;
   a size to indicate a size capacity of the work queue;
   a read index to indicate an address at which a work queue element is to be read from the work queue; and
   a write index to indicate an address at which a work queue element is to be written to the work queue.

6. The method of claim 1, the method additionally comprising performing parameter checking;
   issuing a command to destroy the management queue context; and
   if the management queue context is valid, destroying the management queue.

7. The method of claim 1, additionally comprising stalling processing of the management queue of the management queue is active, prior to registering the new management queue.

8. The method of claim 7, additionally comprising resuming processing of the one or more management queue elements on the new management queue.

9. The method of claim 1, the method additionally comprising:
   determining a next location on the management queue to which a management queue element may be written;
   writing the management queue element to the management queue at a virtual address in virtual memory space; and writing data associated with the management queue element to a physical address in physical memory space, wherein the physical address corresponds to the virtual address.

10. The method of claim 9, wherein the virtual address is based on the management queue context of the device.

11. The method of claim 10, wherein said writing the management queue element to a physical address in physical memory space comprises translating the virtual address to the physical address using a translation table.

12. The method of claim 1, the method additionally comprising:
determining a next location on the management queue to which a management queue element may be read;
reading the management queue element from the management queue at a virtual address in virtual memory space; and
reading data associated with the management queue element from a physical address in physical memory space, wherein the physical address corresponds to the virtual address.

13. The method of claim 12, wherein the virtual address is based on the management queue context of the device.

14. The method of claim 12, wherein said reading the management queue element from a physical address in physical memory space comprises translating the virtual address to the physical address using a translation table.

15. An apparatus comprising:
circuitry to:
determine if a management queue associated with a device can be created;
if a management queue can be created, the circuitry to:
allocate virtually contiguous memory to the management queue;
register the management queue; and
create a management queue context;
determine a next location on the management queue to which a management queue element may be written;
write the management queue element to the management queue at a virtual address in virtual memory space; and
write data associated with the management queue element to a physical address in physical memory space, wherein the physical address corresponds to the virtual address.

16. The apparatus of claim 15, wherein said circuitry to determine if a management queue can be created comprises parameter checking, said parameter checking circuitry to:
determine if there is enough memory;
determine if management queues are available; and
determine if a requested management queue size can be supported.

17. The apparatus of claim 15, wherein said circuitry to allocate virtually contiguous memory to a management queue comprises circuitry to:
determine a size of the virtually contiguous memory; and
pin the allocated virtually contiguous memory.

18. The apparatus of claim 15, wherein the management queue comprises a work queue, and the management queue context comprises a work queue context.

19. The apparatus of claim 18, wherein said creating a work queue context comprises creating information about the work queue, the information comprising at least one of:
a base address to indicate the starting address of the allocated virtually contiguous memory;
a size to indicate a size capacity of the work queue;
a read index to indicate an address at which a work queue element is to be read from the work queue; and
a write index to indicate an address at which a work queue element is to be written to the work queue.

20. The apparatus of claim 15, the apparatus additionally comprising circuitry to:
perform parameter checking;
issue a command to destroy the management queue context; and
if the management queue context is valid, destroy the management queue.

21. The apparatus of claim 15, additionally comprising circuitry to:
check one or more parameters to determine if resizing of the management queue is possible, the management queue having one or more management queue elements;
allocate virtually contiguous memory to a new management queue;
register the new management queue;
copy the one or more management queue elements to the new management queue;
update the new management queue; and
perform cleanup operations.

22. The apparatus of claim 15, the apparatus additionally comprising circuitry to:
determine a next location on the management queue to which a management queue element may be read;
read the management queue element from the management queue at a virtual address in virtual memory space; and
read data associated with the management queue element from a physical address in physical memory space, wherein the physical address corresponds to the virtual address.

23. A system comprising:
a circuit board that includes a circuit card slot;
a device coupled to the circuit board via the circuit card slot; and
a memory having circuitry to manage the device, the circuitry to:
determine if a management queue associated with the device can be created;
if a management queue can be created:
allocate virtually contiguous memory to the management queue;
register the management queue; and
create a management queue context;
check one or more parameters to determine if resizing of the management queue is possible, the management queue having one or more management queue elements;
allocate virtually contiguous memory to a new management queue;
register the new management queue;
copy the one or more management queue elements to the new management queue;
update the new management queue; and
perform cleanup operations.

24. The system of claim 23, wherein the devices comprises an RNIC (RDMA-Remote Direct Memory Access—Network Interface Card).

25. The system of claim 23, wherein said circuitry to determine if a management queue can be created comprises circuitry to check parameters, said circuitry to:
determine if there is enough memory;
determine if management queues are available; and
determine if a requested management queue size can be supported.

26. The system of claim 23, wherein said circuitry to allocate virtually contiguous memory to a management queue comprises circuitry to:
- determine a size of the virtually contiguous memory; and
- pin the allocated virtually contiguous memory.

27. The system of claim 23, said circuitry to additionally:
- perform parameter checking;
- issue a command to destroy the management queue context; and
- if the management queue context is valid, destroy the management queue.

28. The system of claim 23, said circuitry to additionally:
- determine a next location on the management queue to which a management queue element may be written;
- write the management queue element to the management queue at a virtual address in virtual memory space; and
- write data associated with the management queue element to a physical address in physical memory space, wherein the physical address corresponds to the virtual address.

29. The system of claim 23, said circuitry to additionally:
- determine a next location on the management queue to which a management queue element may be read;
- read the management queue element from the management queue at a virtual address in virtual memory space; and
- read data associated with the management queue element from a physical address in physical memory space, wherein the physical address corresponds to the virtual address.

30. An article of manufacture comprising a computer-readable memory having computer-accessible instructions stored thereon, the instructions when executed by a computer, result in the following:
- determining if a management queue associated with a device can be created; and
- if a management queue can be created:
  - allocating virtually contiguous memory to the management queue;
  - registering the management queue; and
  - creating a management queue context;
- checking one or more parameters to determine if resizing of the management queue is possible, the management queue having one or more management queue elements;
- allocating virtually contiguous memory to a new management queue;
- registering the new management queue;
- copying the one or more management queue elements to the new management queue;
- updating the new management queue; and
- performing cleanup operations.

31. The article of claim 30, wherein said instructions that result in determining if a management queue can be created comprises instructions that result in:
- determining if there is enough memory;
- determining if management queues are available; and
- determining if a requested management queue size can be supported.

32. The article of claim 30, wherein the instructions that result in allocating virtually contiguous memory to a management queue comprises instructions that result in:
- determining a size of the virtually contiguous memory; and
- pinning the allocated virtually contiguous memory.

33. The article of claim 30, additionally comprising instructions that result in:
- performing parameter checking;
- issuing a command to destroy the management queue context; and
- if the management queue context is valid, destroying the management queue.

34. The article of claim 30, additionally comprising instructions that result in:
- determining a next location on the management queue to which a management queue element may be written;
- writing the management queue element to the management queue at a virtual address in virtual memory space; and
- writing data associated with the management queue element to a physical address in physical memory space, wherein the physical address corresponds to the virtual address.

35. The article of claim 30, additionally comprising instructions that result in:
- determining a next location on the management queue to which a management queue element may be read;
- reading the management queue element from the management queue at a virtual address in virtual memory space; and
- reading data associated with the management queue element from a physical address in physical memory space, wherein the physical address corresponds to the virtual address.

* * * * *